S. RICH.
ANIMAL TRAP.
APPLICATION FILED OCT. 23, 1908.

929,493.

Patented July 27, 1909.

Witnesses
Hugh H. Ott

Inventor
Samuel Rich
By Victor J. Evans
Attorney

UNITED STATES PATENT OFFICE.

SAMUEL RICH, OF ALPHA, WASHINGTON.

ANIMAL-TRAP.

No. 929,493.   Specification of Letters Patent.   Patented July 27, 1909.

Application filed October 23, 1908. Serial No. 459,150.

*To all whom it may concern:*

Be it known that I, SAMUEL RICH, a citizen of the United States of America, residing at Alpha, in the county of Lewis and State of Washington, have invented new and useful Improvements in Animal-Traps, of which the following is a specification.

This invention relates to animal traps, and one of the principal objects of the same is to provide a spring jaw trap which will automatically set when the jaw is thrown open.

Another object of the invention is to provide a simple and efficient spring jaw trap in which the trigger is automatically set to hold the jaw open and is released by means of a bait lever.

Figure 1:
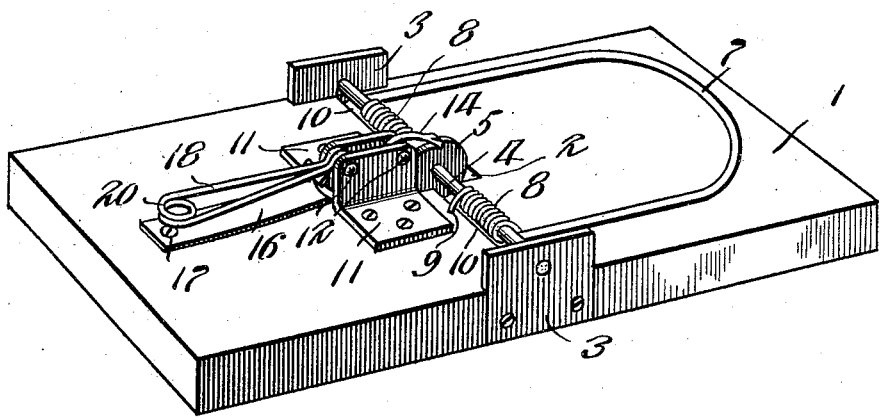
Figure 2:
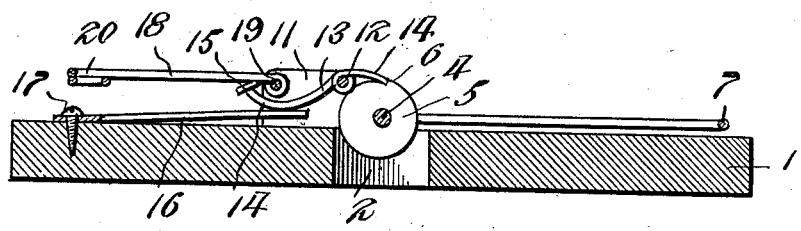

These and other objects may be attained by means of the construction illustrated in the accompanying drawing, in which,—
Figure 1 is a perspective view of a trap made in accordance with my invention, said trap being set. Fig. 2 is a central longitudinal section of the same.

Referring to the drawing, the numeral 1 designates a base provided with a central aperture 2. Secured to the sides of the base are the pintle bearing plates 3, and journaled in said plates is the shaft 4. Secured centrally to said shaft is a disk 5 provided with a notch 6 in the periphery thereof. The spring jaw 7 has its opposite members coiled about the shaft 4, as at 8, and the terminal ends of said jaw members are secured in the base 1, as shown at 9. The base 1 may be provided with a groove 10 to accommodate the coiled portions 8 of the jaw.

Angular bearing plates 11 are secured centrally to the base 1, and pivotally mounted upon a pin 12 which is secured to said bearing plates is a trigger 13 provided with a projecting portion 14 which engages the notch 6 in the disk 5, the opposite end of said trigger being curved upwardly, as at 14, and provided with a terminal cross bar 15. A spring 16 secured to the base 1 by means of a screw 17 has its free end disposed underneath the curved portion 14 of the trigger, the tension of said spring being exerted to hold the projected end 14 of said trigger in the notch 6. A bait lever 18, preferably formed of wire, has its terminal ends pivoted upon a pin 19 secured to the base plates 11, said lever having a coiled outer end 20 designed for holding the bait.

The operation of my invention may be briefly described as follows:—When the lever 18 is touched by an animal the cross bar 15 is depressed by said lever, which serves to raise the projected end 14 from the notch 6 and to permit the springs 8 to throw the jaw 7 to the opposite side of the base. In setting the trap, when the jaw member 7 is thrown into the position shown in Fig. 1, the trigger automatically engages the notch 6 owing to the stress of the spring 16.

From the foregoing it will be obvious that an animal trap made in accordance with my invention is of simple construction, can be manufactured at slight cost and is automatically set when the bail is swung to an operative position, thus preventing accidents or injury during the setting of the trap.

I claim:—

1. A trap comprising a base, a shaft journaled on the base, a spring jaw connected to said shaft, a disk provided with a notch and secured to said shaft, a spring-acting trigger for engaging said notch automatically when the jaw is set, and a bait lever for bearing upon the free end of said trigger to release the same.

2. A spring jaw trap comprising a base, a shaft journaled on the base, a spring jaw mounted upon said shaft a spring trigger, means on said shaft designed to coöperate with said trigger to hold the trap in set position automatically, and a bait lever for releasing said trigger.

3. A trap comprising a base, a shaft mounted to rotate upon said base, a spring jaw having its ends connected to said shaft, a notched disk secured centrally to said shaft, a trigger for engaging said notch, a spring for holding said trigger in engaged position, and a bait lever engaging one end of said trigger to release the same.

In testimony whereof I affix my signature in presence of two witnesses.

SAMUEL RICH.

Witnesses:
W. E. BISHOP,
H. E. DONOHOE.